(12) United States Patent
Niu et al.

(10) Patent No.: US 12,117,020 B2
(45) Date of Patent: Oct. 15, 2024

(54) AIR COMPRESSOR AND VEHICLE

(71) Applicant: GREAT WALL MOTOR COMPANY LIMITED, Baoding (CN)

(72) Inventors: Pengfei Niu, Baoding (CN); Zhengyu Wang, Baoding (CN); Haifeng Tang, Baoding (CN); Gaoxia Zhao, Baoding (CN); Xiaoliang Chen, Baoding (CN); Tao Guo, Baoding (CN); Zeyu Zhang, Baoding (CN); Xiangjun Wang, Baoding (CN); Peiming Wu, Baoding (CN); Olgierd Krzysztof Urbanczyk, Baoding (CN); Lei Gao, Baoding (CN); Haichao Yu, Baoding (CN); Yang Feng, Baoding (CN); Minglong Kang, Baoding (CN); Dapeng Gao, Baoding (CN); Zili Ren, Baoding (CN); Ruyi Yang, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 91 days.

(21) Appl. No.: 17/790,467

(22) PCT Filed: Feb. 26, 2021

(86) PCT No.: PCT/CN2021/078159
§ 371 (c)(1),
(2) Date: Jun. 30, 2022

(87) PCT Pub. No.: WO2021/170088
PCT Pub. Date: Sep. 2, 2021

(65) Prior Publication Data
US 2023/0049251 A1    Feb. 16, 2023

(30) Foreign Application Priority Data
Feb. 28, 2020 (CN) .......................... 202010127802.4

(51) Int. Cl.
*F04D 29/58* (2006.01)
*F04D 25/06* (2006.01)
(Continued)

(52) U.S. Cl.
CPC ..... *F04D 29/5806* (2013.01); *F04D 27/0207* (2013.01); *F04D 29/0513* (2013.01); *F04D 29/4206* (2013.01)

(58) Field of Classification Search
CPC ..... Y02E 60/50; F04D 25/06; F04D 29/5806; F04D 29/0513; F04D 29/162;
(Continued)

(56) References Cited

U.S. PATENT DOCUMENTS 3,828,610 A * 8/1974 Swearingen ........ F16C 32/0692
384/107
3,895,689 A   7/1975 Swearingen
(Continued)

FOREIGN PATENT DOCUMENTS

CN    102094845 A    6/2011
CN    103650226 A    3/2014
(Continued)

OTHER PUBLICATIONS

International Search Report of PCT/CN2021/078159 dated Apr. 29, 2021, with English translation.
(Continued)

*Primary Examiner* — Eric J Zamora Alvarez
(74) *Attorney, Agent, or Firm* — Nath, Goldberg & Meyer; Jerald L. Meyer (57) ABSTRACT

The air compressor includes: a housing assembly, wherein the housing assembly has a first installation cavity, a second installation cavity and a rotation-shaft cooperating cavity, and the first installation cavity has a gas inlet and a gas outlet; a rotor shaft, wherein the rotor shaft is rotatably fitted
(Continued)

inside the rotation-shaft cooperating cavity, and extends into the first installation cavity and the second installation cavity; a pressure wheel, wherein the pressure wheel is nested to the rotor shaft and is located inside the first installation cavity, and the housing assembly is provided with a controlling flow channel for communicating the gas-intake side and the wheel-back side of the pressure wheel; and a driving assembly, wherein the driving assembly is nested to the rotor shaft and is located inside the second installation cavity.

17 Claims, 7 Drawing Sheets

(51) Int. Cl.
*F04D 27/02* (2006.01)
*F04D 29/051* (2006.01)
*F04D 29/10* (2006.01)
*F04D 29/42* (2006.01)
*F04D 29/44* (2006.01)

(58) Field of Classification Search
CPC .... F04D 29/284; F04D 27/02; F04D 27/0207; F04D 29/4206; F04D 29/584; F04D 17/10; F04D 27/0215; F04D 29/051; F04D 29/2266; F04D 1/00; F04D 29/4213; F04D 29/582; F04D 29/5846; F04D 29/041; F04D 27/009; F04D 29/0413; F04D 29/046; F04D 29/20; F04D 29/2255; F04D 29/403; F04D 29/684; F04D 25/04; F04D 25/045; F04D 29/056; F04D 29/102; F04D 29/441; F01D 11/02; F01D 25/12; F01D 3/04; F01D 11/003; F01D 3/00; Y02T 90/40; B60L 50/70
See application file for complete search history.

(56) References Cited

U.S. PATENT DOCUMENTS

| | | | | |
|---|---|---|---|---|
| 4,287,758 A | * | 9/1981 | Swearingen | F04D 29/0513 384/307 |
| 4,472,107 A | * | 9/1984 | Chang | F01D 3/04 415/170.1 |
| 5,156,522 A | * | 10/1992 | Tessier | F04D 29/445 415/58.4 |
| 5,209,652 A | * | 5/1993 | Fischer | F04D 29/0413 417/409 |
| 2015/0016981 A1 | * | 1/2015 | Sano | F04D 29/051 415/206 |
| 2015/0285263 A1 | * | 10/2015 | Bucking | F02C 6/12 415/116 |
| 2020/0355192 A1 | * | 11/2020 | Nejedly | F04D 29/0516 |

FOREIGN PATENT DOCUMENTS

| | | |
|---|---|---|
| CN | 103671222 A | 3/2014 |
| CN | 104895827 A | 9/2015 |
| CN | 106286338 A | 1/2017 |
| CN | 109 737066 A | 5/2019 |
| CN | 209 340175 U | 9/2019 |
| CN | 110500293 A | 11/2019 |
| DE | 10 2018 201162 A1 | 7/2019 |
| EP | 2 025 896 A2 | 2/2009 |
| JP | 2011-202641 A | 10/2011 |
| JP | 2016-160760 A | 9/2016 |
| KR | 10-2007-00957 45 | 10/2007 |

OTHER PUBLICATIONS

Office Action of corresponding Chinese application No. 202010127802.4.

* cited by examiner

AIR COMPRESSOR AND VEHICLE

CROSS REFERENCE TO RELEVANT APPLICATIONS

This is a National Phase Application filed under 35 U.S.C. 371 as a national stage of PCT/CN2021/078159 filed Feb. 26, 2021, which claims the priority of the Chinese patent application filed on Feb. 28, 2020 before the Chinese Patent Office with the application number of 202010127802.4 and the title of "AIR COMPRESSOR AND VEHICLE", each of which is incorporated herein in its entirety by reference.

TECHNICAL FIELD

The present disclosure relates to the technical field of air compressors, and particularly relates to an air compressor and a vehicle having the air compressor.

BACKGROUND

In order to guarantee the normal operation of fuel cell engines, it is required to install auxiliary systems such as a hydrogen supplying system, a clean-fresh-air supplying system and a circulating-water-cooling managing system. Moreover, air supply of a high quality and a high flow rate has an obvious effect for the increasing of the power output of fuel cell engines, thus an air compressor is usually required to perform forced gas intake. Because proton exchange membranes have a very high requirement on the degree of the cleanliness of the air, air compressors are not allowed to use conventional oil-lubricated bearings (for example, a dynamic-pressure sliding bearing), but usually a dynamic pressure air bearing is used to support the rotor and offset the axial load of the rotor system.

In the related art, in the compressors of fuel cells, the axial force is usually improved by using the following four technical solutions:

1. By using two-stage series boosting, i.e., by using impellers of opposite orientations to offset the axial force. Because the series pipeline and the second-stage impeller and housing are added, the volume of the entire air compressor is increased, which, as compared with single-stage boosting, has a complicated structure, a lower efficiency, a higher volume and a higher cost.
2. By using a balance board design, i.e., installing a balance board at the other end of the single-stage impeller. However, merely when the diameters of the balance board and the impeller are similar, the axial force can be offset to the utmost extent. The balance board itself has a certain mass, which, in rotation, generates an additional power consumption. Leakage of the lead-in high-pressure gas also causes power loss.
3. By using a grease-lubricated ball bearing, which can tolerate a large axial force. However, the grease-lubricated ball bearing has the risk of leakage of the lubricating grease, which in turn pollutes the whole fuel cell system, to cause failure. That is the reason why oil-free-lubricated bearings are commonly used.
4. By increasing the area of the loading region of the thrust bearing to increase the loading capacity. However, while the loading capacity of the thrust bearing is increased, the power consumption of the bearing is increased, which increases the cost of the bearing. At a same time, a large outer diameter of the thrust bearing requires a large rotor of the thrust bearing to match with it, whereby the rotational inertia of the entire rotor system is increased, and the risk of wearing of the thrust bearing is increased.

SUMMARY

In view of the above, the present disclosure provides an air compressor, to reduce the axial force, prolong the service life, improve the efficiency of the system and improve the performance.

In order to achieve the above object, the technical solutions of the present disclosure are realized as follows:

An air compressor according to an embodiment of the first aspect of the present disclosure includes:
  a housing assembly, wherein the housing assembly has a first installation cavity, a second installation cavity and a rotation-shaft cooperating cavity, the rotation-shaft cooperating cavity is disposed between the first installation cavity and the second installation cavity, and the first installation cavity has a gas inlet and a gas outlet;
  a rotor shaft, wherein the rotor shaft is rotatably fitted inside the rotation-shaft cooperating cavity, and extends into the first installation cavity and the second installation cavity;
  a pressure wheel, wherein the pressure wheel is nested to the rotor shaft and is located inside the first installation cavity, and the housing assembly is provided with a controlling flow channel for communicating a gas-intake side and a wheel-back side of the pressure wheel; and
  a driving assembly, wherein the driving assembly is nested to the rotor shaft and is located inside the second installation cavity.

The air compressor according to the embodiment of the present disclosure, by using the controlling flow channel, the high-pressure gas on the wheel-back side of the pressure wheel is guided to the gas-intake side of the pressure wheel, to convert a part of the pressure energy of the gas into kinetic energy, thereby effectively reducing the pressure on the wheel-back side of the pressure wheel, and reducing the axial force, which can prolong the service life of the air compressor, and improve the efficiency of the entire system. Furthermore, the air compressor has a simple and effective structure and a low cost. Moreover, the gas flowing back to the gas-intake side of the pressure wheel re-enters the pressure wheel to be compressed, which can effectively improve the field surging characteristic of the air compressor, thereby improving the performance of the air compressor.

According to some embodiments of the present disclosure, the first installation cavity is provided with a returning opening, and the returning opening is disposed on the gas-intake side of the pressure wheel and is in communication with the controlling flow channel.

In some particular embodiments of the present disclosure, the controlling flow channel includes an internal flow channel and an external flow channel, the internal flow channel is defined by the housing assembly and is in communication with the wheel-back side of the pressure wheel, the external flow channel is in communication with the internal flow channel and the returning opening and is located outside the housing assembly, and the external flow channel includes a communicating pipe.

Optionally, the internal flow channel is in an axial direction of the rotor shaft, and is located between the first installation cavity and the second installation cavity.

According to some embodiments of the present disclosure, the housing assembly includes:
  a pressing housing, wherein the pressing housing defines the first installation cavity;
  a driving housing, wherein the driving housing defines the second installation cavity; and
  a back plate, wherein the back plate is disposed between the pressing housing and the driving housing, the back plate is located on the wheel-back side of the pressure wheel and forms a back-pressure gap with the pressure wheel, the driving housing is disposed on one side of the back plate that is opposite to the pressure wheel, and the back plate and the driving housing enclose to form a thrust cavity; and
  the back plate is provided with a first rotation-shaft hole, a second rotation-shaft hole is disposed inside the driving housing, a thrust bearing is disposed inside the thrust cavity, and the first rotation-shaft hole, the second rotation-shaft hole and the thrust cavity jointly define the rotation-shaft cooperating cavity.

In some embodiments of the present disclosure, a gas guiding channel is disposed at one of the back plate and the driving housing, and the gas guiding channel is in communication with the back-pressure gap to form a part of the controlling flow channel.

Optionally, a gas guiding channel is formed between the back plate and the driving housing, a gas guiding hole is disposed at the back plate or the driving housing, and the back-pressure gap, the gas guiding channel and the gas guiding hole are communicated to form a part of the controlling flow channel.

In some particular embodiments of the present disclosure, the back-pressure gap is in communication with the gas guiding channel or the gas guiding hole via the rotation-shaft cooperating cavity.

Optionally, a shaft seal is nested to the rotor shaft, the rotor shaft is mounted inside the first rotation-shaft hole by using the shaft seal, a flowing gap is formed between the shaft seal and an inner wall of the first rotation-shaft hole, and the gas guiding channel or the gas guiding hole is in communication with the back-pressure gap via the flowing gap.

Optionally, a maze sealing member is disposed between the shaft seal and the first rotation-shaft hole.

In some embodiments of the present disclosure, the gas guiding hole comprises a first gas guiding hole and a second gas guiding hole, the first gas guiding hole is disposed at a position of the back plate closer to a central part of the back plate, the second guiding hole is disposed at an edge of the back plate; the gas guiding channel includes a flow guiding gap formed between the driving housing and the back plate, and a ventilating gap formed between the driving housing and the back plate, two ends of the ventilating gap are in communication with one side of the thrust cavity and the first gas guiding hole, and the second gas guiding hole is in communication with the flow guiding gap.

In some particular embodiments of the present disclosure, a holding ring is disposed inside the thrust cavity, the holding ring is sandwiched between the driving housing and the back plate, and the holding ring is provided with a ventilating hole that communicates with the thrust cavity and the gas guiding channel.

Optionally, the thrust bearing includes a thrust rotor and a bearing foil; and
  the thrust rotor is nested to the rotor shaft, the bearing foil is disposed on a side wall of the thrust cavity, and the bearing foil and the thrust rotor are spaced to form a thrust gap that is in communication with the first rotation-shaft hole.

Optionally, the housing assembly is provided with a cooling flow channel.

Optionally, the cooling flow channel is adjacent to the thrust bearing and the internal flow channel, and the cooling flow channel is annular; or
  the cooling flow channel surrounds the second rotation-shaft hole.

Optionally, the driving housing is further provided with a cooling passage, and the cooling passage is connected to the cooling flow channel by a connecting passage; and
  the driving housing, the cooling flow channel and the cooling passage form an integral structure; or
  the driving housing, the cooling flow channel and the cooling passage form a separated structure.

Optionally, the cooling flow channel is provided with a coolant outlet, and a cooling passage of the driving housing is provided with a coolant inlet; and
  a separating opening is disposed between the coolant inlet and the cooling passage of the driving housing.

Optionally, rubber sealing rings are provided individually at a connection between the pressing housing and the driving housing and at a connection between the pressing housing and the back plate.

Another object of the present disclosure is to provide a vehicle, to reduce the axial force, prolong the service life, improve the efficiency of the system and improve the performance of the fuel cell.

In order to achieve the above object, the technical solutions of the present disclosure are realized as follows:

A vehicle, wherein the vehicle includes the air compressor according to the embodiments of the first aspect of the present disclosure.

The vehicle according to the embodiment of the present disclosure, by using the air compressor according to the embodiments of the first aspect of the present disclosure, effectively reduces the pressure on the wheel-back side of the pressure wheel, and reduces the axial force, which can prolong the service life of the fuel cell, and improve the efficiency of the entire system. Furthermore, the vehicle has a simple and effective structure and a low cost. Moreover, the vehicle can effectively improve the field surging characteristic of the air compressor, thereby improving the performance of the fuel cell.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

The drawings, which form part of the present disclosure, are intended to provide a further understanding of the present disclosure. The illustrative embodiments of the present disclosure and their explanation are intended to interpret the present disclosure, and do not inappropriately limit the present disclosure. Apparently, the figures that are described below are embodiments of the present disclosure, and a person skilled in the art can obtain other figures according to these figures without paying creative work. In the drawings.

DESCRIPTION OF THE REFERENCE NUMBERS air compressor 10, bolt 11, external flow channel 12, rubber sealing ring 13, and nut 14;

housing assembly 100, first installation cavity 101, second installation cavity 102, flow guiding gap 103, thrust cavity 104, back-pressure gap 105 and ventilating gap 106;

pressing housing 110, returning opening 111, gas releasing hole 112, gas inlet 113, gas outlet 114, driving housing 120, second rotation-shaft hole 121, back plate 130, first rotation-shaft hole 131, gas guiding hole 132, cover plate 140, cooling flow channel 151, cooling passage 152, coolant inlet 153, coolant outlet 154, connecting passage 155 and separating opening 156; and rotor shaft 200, shaft seal 210, maze sealing member 211, pressure wheel 300, thrust bearing 400, thrust rotor 410, bearing foil 420, holding ring 430, ventilating hole 431, radial air bearing 500, sleeve 510, bearing seat 520, driving assembly 600, electric-motor stator 610 and electric-motor rotor 620.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

It should be noted that, subject to the avoiding of any conflict, the embodiments and the features of the embodiments of the present disclosure may be combined.

The present disclosure will be described in detail below with reference to the drawings and the embodiments.

As shown in FIGS. 1-10, an air compressor 10 according to an embodiment of the first aspect of the present disclosure includes: a housing assembly 100, a rotor shaft 200, a pressure wheel 300 and a driving assembly 600.

Figure 2:
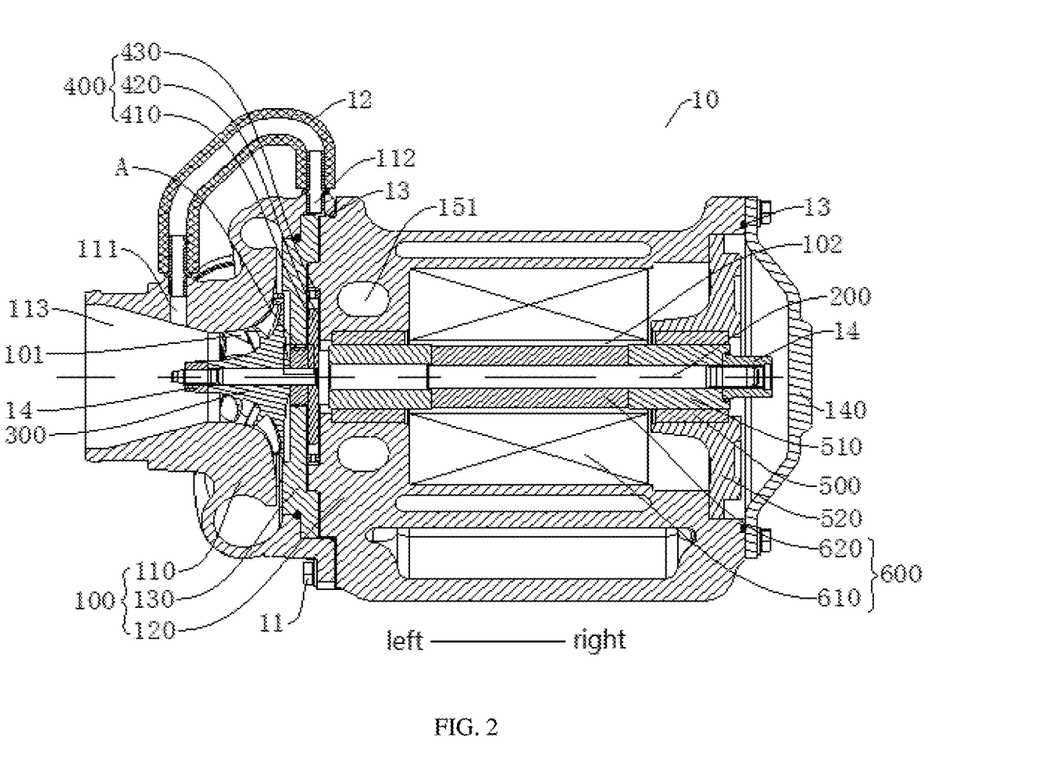
FIG. 2 is a schematic structural diagram of the air compressor according to an embodiment of the present disclosure.

Particularly, the housing assembly 100 has a first installation cavity 101, a second installation cavity 102 and a rotation-shaft cooperating cavity, the rotation-shaft cooperating cavity is disposed between the first installation cavity 101 and the second installation cavity 102, and the first installation cavity 101 has a gas inlet 113 and a gas outlet 114. For example, the gas inlet 113 opens forwardly, and the gas outlet 114 is disposed at the peripheral wall of the housing assembly 100. The rotor shaft 200 is rotatably fitted inside the rotation-shaft cooperating cavity, and the rotor shaft 200 extends into the first installation cavity 101 and the second installation cavity 102. In other words, the rotation-shaft cooperating cavity is in communication with the first installation cavity 101 and the second installation cavity 102. The pressure wheel 300 is nested to the rotor shaft 200, the pressure wheel 300 is located inside the first installation cavity 101, and the housing assembly 100 is provided with a controlling flow channel for communicating the gas-intake side and the wheel-back side of the pressure wheel 300. The driving assembly 600 is nested to the rotor shaft 200, and the driving assembly 600 is located inside the second installation cavity 102, to provide the power. For example, the driving assembly 600 may include an electric-motor stator 610 and an electric-motor rotor 620, and the electric-motor rotor 620 is rotatably disposed inside the electric-motor stator 610.

The driving assembly 600 drives the rotor shaft 200 to rotate, to drive the coaxial pressure wheel 300 to rotate. The air of a normal temperature and a normal pressure enters the pressure wheel 300 via the gas inlet 113, and the rotating pressure wheel 300, because of its special flowing structure, applies work to the air, whereby the air of the normal pressure, when flowing out of the pressure wheel 300, becomes a compressed air of a very high pressure. The air flowing out of the pressure wheel 300 is split into two parts, wherein one part is further boosted by the flow channel of the housing assembly 100 and inputted into the fuel-cell system, and the other part flows into the controlling flow channel.

The controlling flow channel may be disposed outside the housing assembly 100. Alternatively, the controlling flow channel may also be disposed inside the housing assembly 100. Certainly, the controlling flow channel may also be configured so that part of it is provided outside the housing assembly 100, and the other part is disposed inside the housing assembly 100. It is merely required that the controlling flow channel can be in communication with the gas-intake side and the wheel-back side of the pressure wheel 300, and the present disclosure does not particularly limit herein.

Figure 1:
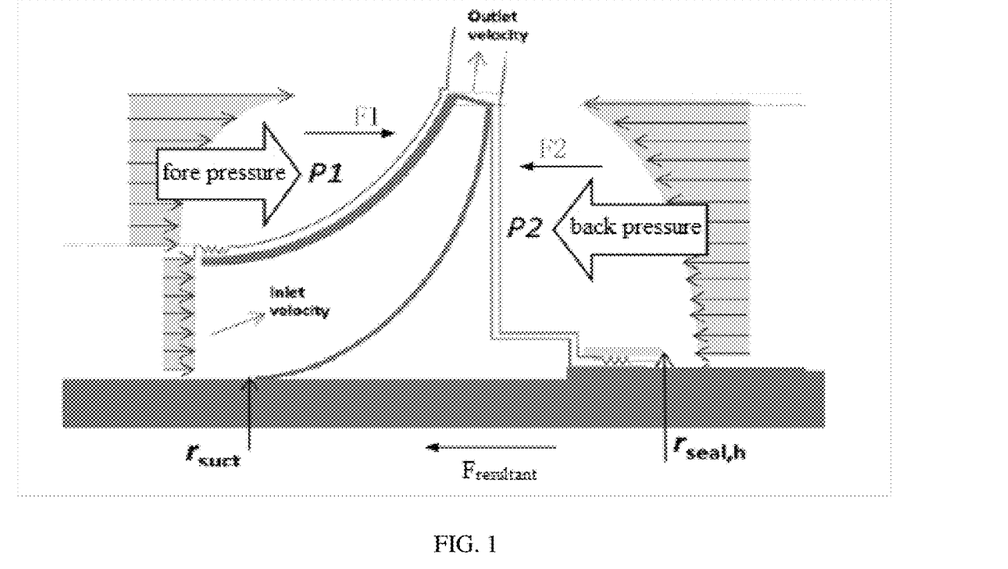
FIG. 1 is a schematic diagram of the principle of the generation of the axial force of an air compressor in the related art.

In the related art, as shown in FIG. 1, the air compressor compresses the air in the operation, to enable the gas to reach a certain pressure to satisfy the demand by the chemical reaction of the fuel-cell reactor. At this point, the pressure (i.e., the fore pressure) of the gas on the gas-intake side of the pressure wheel is P1, the gas pressure is increased by the rotation of the pressure wheel, and the pressure (i.e., the back pressure) of the gas at the outlet and the wheel-back side of the pressure wheel is P2, wherein P2>P1. The pressure of the gas acts on the pressure wheel to generate the forces F1 and F2, and F1 and F2 have opposite directions. Because the pressure P2 on the wheel-back side is higher, finally the direction of the resultant force $F_{resultant}$ is the same as the direction of the force F2 generated by P2. That is the reason why the axial force is generated.

By research, the inventor of the present disclosure has found out that a too large axial force increases the possibility of bearing wear and reduces the reliability of the thrust bearing, thereby reducing the life of the air compressor of the fuel cell, and a too large axial force results in compelled increasing of the loading area of the thrust bearing in the designing, to offset the axial force, which results in the increasing of the frictional area of the thrust bearing, and the increasing of the power loss and the heat productivity, thereby reducing the efficiency of the entire system.

The air compressor 10 according to the embodiment of the present disclosure, by using the controlling flow channel, the high-pressure gas on the wheel-back side of the pressure wheel 300 is guided to the gas-intake side of the pressure wheel 300, to convert a part of the pressure energy of the gas into kinetic energy, thereby effectively reducing the pressure on the wheel-back side of the pressure wheel 300, and reducing the axial force, which can prolong the service life of the air compressor 10, and improve the efficiency of the entire system. Furthermore, the air compressor has a simple and effective structure and a low cost. Moreover, the gas flowing back to the gas-intake side of the pressure wheel 300 can re-enter the pressure wheel 300 to be compressed, which can effectively improve the field surging characteristic of the air compressor 10, thereby improving the performance of the air compressor 10.

According to some embodiments of the present disclosure, as shown in FIG. 2, the first installation cavity 101 has an extending-throughout returning opening 111, the returning opening 111 is disposed on the gas-intake side of the pressure wheel 300, and the returning opening 111 is in communication with the controlling flow channel.

In some embodiments of the present disclosure, as shown in FIG. 2, the controlling flow channel includes an internal flow channel and an external flow channel 12. The internal flow channel is defined by the housing assembly 100, the internal flow channel is in communication with the wheel-back side of the pressure wheel 300, the external flow channel 12 is located outside the housing assembly 100, and the external flow channel 12 is in communication with the internal flow channel and the returning opening 111. The external flow channel 12 may include a communicating pipe.

Particularly, the returning opening 111 is located on the gas-intake side of the pressure wheel 300, and the wheel-back side of the pressure wheel 300 is in communication with the returning opening 111 via the internal flow channel and the external flow channel 12, thereby realizing the communication with the gas-intake side of the pressure wheel 300. In other words, the gas on the wheel-back side of the pressure wheel 300 may sequentially pass through the internal flow channel, the external flow channel 12 and the returning opening 111 and then flow back to the gas-intake side of the pressure wheel 300.

The gas on the wheel-back side of the pressure wheel 300, when flowing to the external flow channel 12, still has a certain positive pressure, and the returning opening 111 is located behind the operation of the air filter and in front of the pressure wheel 300, by the effects of the pressure drop of the air filter and the suction of the pressure wheel 300, the pressure of the gas at the returning opening 111 is slightly less than the atmospheric pressure. Accordingly, the gas inside the air compressor 10 can form an automatic and smooth circulation among the gas-intake side of the pressure wheel 300, the wheel-back side of the pressure wheel 300, the internal flow channel and the external flow channel 12, thereby reducing the pressure on the wheel-back side of the pressure wheel 300, and reducing the axial force.

In some embodiments of the present disclosure, as shown in FIG. 2, the internal flow channel is located between the first installation cavity 101 and the second installation cavity 102 in the axial direction of the rotor shaft 200. For example, the internal flow channel is located at the rear of the first installation cavity 101 and located in front of the second installation cavity 102. Accordingly, the flowing gas can take away the heat generated by the component parts at the corresponding position.

According to some embodiments of the present disclosure, as shown in FIG. 2, the housing assembly 100 includes: a pressing housing 110, a driving housing 120 and a back plate 130. The pressing housing 110 defines the first installation cavity 101, and the driving housing 120 defines the second installation cavity 102. The back plate 130 is disposed between the pressing housing 110 and the driving housing 120, the back plate 130 is located on the wheel-back side of the pressure wheel 300, and a back-pressure gap 105 is formed between the back plate 130 and the pressure wheel 300. That can prevent collision and friction of the pressure wheel 300 in operation, and allows the flowing of the high-pressure gas after the boosting at the same time. The driving housing 120 is disposed on the side of the back plate 130 that is opposite to the pressure wheel 300, and the back plate 130 and the driving housing 120 enclose to form a thrust cavity 104. The back plate 130 is provided with a first rotation-shaft hole 131, a second rotation-shaft hole 121 is disposed inside the driving housing 120, a thrust bearing 400 is disposed inside the thrust cavity 104, and the first rotation-shaft hole 131, the second rotation-shaft hole 121 and the thrust cavity 104 jointly define the rotation-shaft cooperating cavity.

Particularly, the pressing housing 110 and the driving housing 120 may be mounted and fixed by using a bolt 11, and the back plate 130 is clamped between the pressing housing 110 and the driving housing 120; in other words, the back plate 130 is located at the rear of the pressing housing 110 and located in front of the driving housing 120. The pressing housing 110 presses the back plate 130 and the thrust bearing 400 onto the driving housing 120 in the front-rear direction. Accordingly, the structure is simple and reliable. The thrust cavity 104 is defined by the rear surface of the back plate 130 and the front end face of the driving housing 120, the first rotation-shaft hole is in communication with the first installation cavity 101, the second rotation-shaft hole is in communication with the second installation cavity 102, and the thrust cavity 104 is in communication with the first rotation-shaft hole 131 and the second rotation-shaft hole 121. Accordingly, the gas can flow through the thrust cavity 104 and cool the thrust bearing 400, and can cool the component parts inside the second installation cavity 102.

Optionally, as shown in FIG. 2, a rubber sealing ring 13 is disposed at the connection between the pressing housing 110 and the driving housing 120, and a rubber sealing ring 13 is disposed at the connection between the pressing housing 110 and the back plate 130. That can prevent gas leakage, thereby ensuring that the gas smoothly flows inside the internal flow channel.

Figure 11:
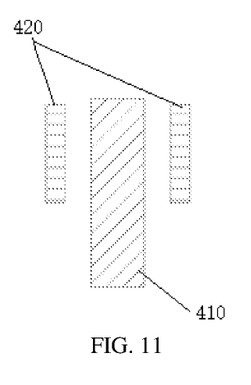
FIG. 11 is a schematic diagram showing the position relationship of a bearing foil and a thrust rotor.

In some embodiments of the present disclosure, as shown in FIG. 2 and FIG. 11, the thrust bearing 400 may include: a thrust rotor 410, a bearing foil 420 and a holding ring 430. The thrust rotor 410 is nested to the rotor shaft 200, the bearing foil 420 is disposed on the side wall of the thrust cavity 104, and the bearing foil 420 and the thrust rotor 410 are spaced to form a thrust gap that is in communication with the first rotation-shaft hole 131. The holding ring 430 is disposed inside the thrust cavity 104, the holding ring 430 surrounds the thrust rotor 410, and the holding ring 430 is sandwiched between the driving housing 120 and the back plate 130. For example, the bearing foil 420 is two bearing foils 420, the thrust rotor 410 is located between the two bearing foils 420 in the front-rear direction, and the front end face and the rear end face of the thrust rotor 410 form thrust gaps individually with the two bearing foils 420, to allow gas flowing. Furthermore, the thrust rotor 410 and the bearing foil 420, in the relative movement, because of the particularly designed structure, generate a dynamic pressure, to balance the axial force acting on the pressure wheel 300.

In some embodiments of the present disclosure, a gas guiding channel is disposed at the back plate 130, and the gas guiding channel is in communication with the back-pressure gap 105 to form a part of the internal flow channel. For example, one end of the gas guiding channel is in communication with the back-pressure gap 105, and the other end is in communication with the external flow channel 12. In this case, the gas guiding channel is in direct communication with the back-pressure gap 105. As another example, the first rotation-shaft hole 131 is in communication with the back-pressure gap 105, one end of the gas guiding channel is in communication with the first rotation-shaft hole 131, and the other end is in communication with the external flow channel 12. In this case, the back-pressure gap 105 is in indirect communication with the gas guiding channel via the rotation-shaft cooperating cavity.

In some other embodiments of the present disclosure, a gas guiding channel is disposed at the driving housing 120, and the gas guiding channel is in communication with the back-pressure gap 105 to form a part of the internal flow channel. For example, the first rotation-shaft hole 131 is in communication with the back-pressure gap 105, the thrust cavity 104 is in communication with the first rotation-shaft hole 131, one end of the gas guiding channel is in communication with the thrust cavity 104, and the other end is in communication with the external flow channel 12. In this case, the back-pressure gap 105 is in indirect communication with the gas guiding channel via the rotation-shaft cooperating cavity. Certainly, the one end of the gas guiding channel in the driving housing 120 may also be in communication with the second rotation-shaft hole 121.

In some other embodiments of the present disclosure, a gas guiding channel is formed between the back plate 130 and the driving housing 120, a gas guiding hole 132 is disposed at one of the back plate 130 and the driving housing, and the back-pressure gap 105, the gas guiding channel and the gas guiding hole 132 are communicated to form part of the internal flow channel.

For example, a gas guiding channel is formed between the back plate 130 and the driving housing 120, a gas guiding hole 132 is disposed at the back plate 130, one end of the gas guiding hole 132 is in communication with the back-pressure gap 105, and the other end is in communication with one end of the gas guiding channel, and the other end of the gas guiding channel is in communication with the external flow channel 12. Although not shown in the drawings, the configuration of the gas guiding hole 132 according to the present embodiment may refer to the structure shown in the drawings of the present disclosure, as long as it can realize the communication between the gas guiding channel and the back-pressure gap 105.

As another example, a gas guiding channel is formed between the back plate 130 and the driving housing 120, a gas guiding hole 132 is disposed at the driving housing 120, one end of the gas guiding hole 132 is in communication with the thrust cavity 104 or the second rotation-shaft hole 121, the other end of the gas guiding hole 132 is in communication with one end of the gas guiding channel, and the other end of the gas guiding channel is in communication with the external flow channel 12. In other words, the back-pressure gap 105 is in communication with the gas guiding hole 132 via the rotation-shaft cooperating cavity. It can also be understood that, although not shown in the drawings, the configuration of the gas guiding hole 132 according to the present embodiment may refer to the structure shown in the drawings of the present disclosure, as long as it can realize the communication between the gas guiding channel and the back-pressure gap 105.

Figure 4:
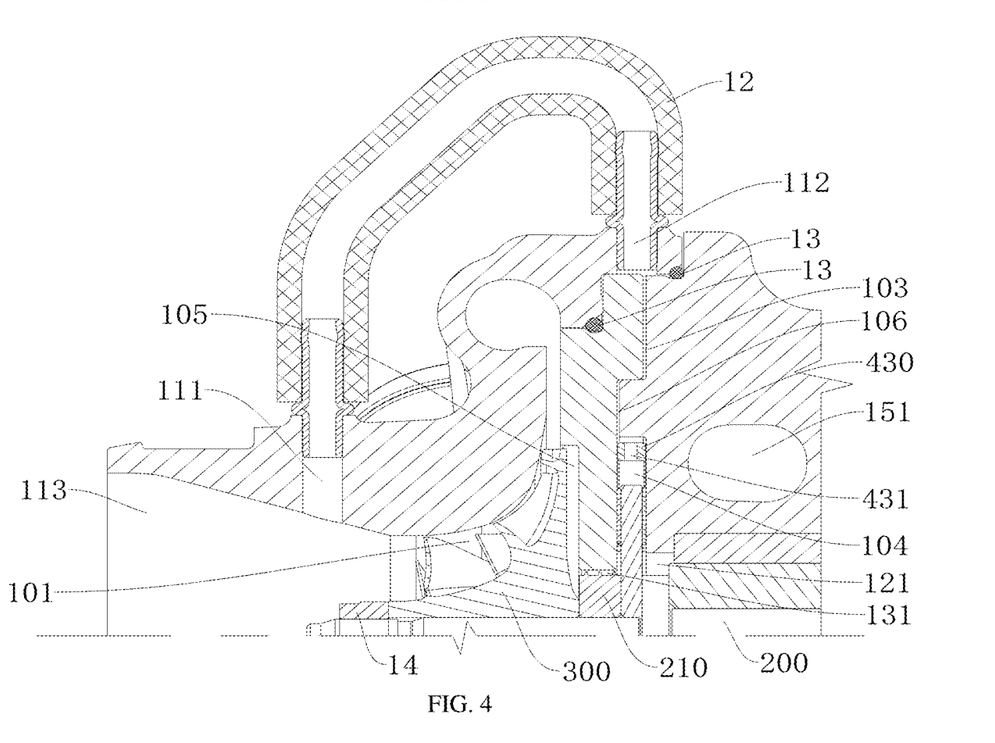
FIG. 4 is a locally schematic structural diagram of the air compressor according to an embodiment of the present disclosure.

As another example, as shown in FIG. 4, a gas guiding channel is formed between the back plate 130 and the driving housing 120, the gas guiding channel includes a flow guiding gap 103 and a ventilating gap 106, a gas guiding hole 132 is disposed at the back plate 130, the two ends of the ventilating gap 106 are individually in communication with one side of the thrust cavity 104 and the gas guiding hole 132, and the other side of the gas guiding hole 132 is in communication with one end of the flow guiding gap 103, or, in other words, the flow guiding gap 103 and the ventilating gap 106 are spaced, and the other end of the flow guiding gap 103 is in communication with the external flow channel 12. In this case, the back-pressure gap 105 is in communication with the gas guiding channel via the rotation-shaft cooperating cavity. The internal flow channel includes the thrust cavity 104, the ventilating gap 106, the gas guiding hole 132 and the flow guiding gap 103. The gas guiding hole 132 may be a semicircular counterbore, a circular counterbore or a hole or slot of another shape, and the gas guiding hole 132 may be a plurality of gas guiding holes 132 that are arranged separately in the circumferential direction of the back plate 130.

Figure 7:
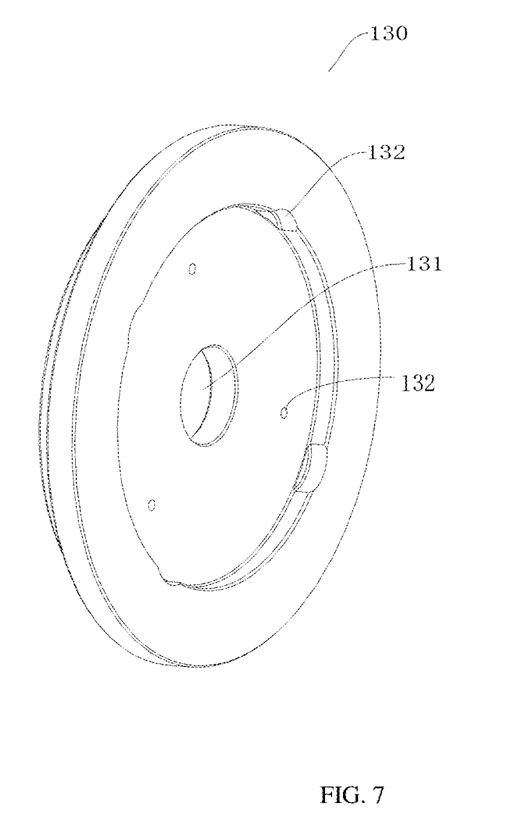
FIG. 7 is a perspective view of the back plate according to an embodiment of the present disclosure.

Optionally, the gas guiding channel includes a flow guiding gap 103 and a ventilating gap 106, and the flow guiding gap 103 and the ventilating gap 106 are spaced. As shown in FIG. 7, the gas guiding hole comprises a first gas guiding hole and a second gas guiding hole, the first gas guiding hole is disposed at a position of the back plate closer to a central part of the back plate, the second guiding hole is disposed at an edge of the back plate, the first gas guiding hole 132 closer to the central part is in communication with the back-pressure gap 105 and the ventilating gap 106, and the second gas guiding hole 132 closer to the edge is in communication with the ventilating gap 106 and the flow guiding gap 103.

Figure 8:
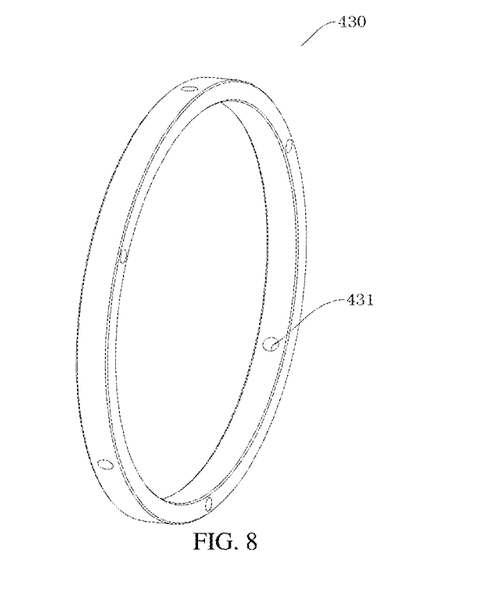
FIG. 8 is a perspective view of the holding ring according to an embodiment of the present disclosure.

In some particular embodiments of the present disclosure, a gas guiding channel is formed between the back plate 130 and the driving housing 120, and as shown in FIGS. 4 and 8, the holding ring 430 is provided with a ventilating hole 431 that communicates with the thrust cavity 104 and the gas guiding channel (for example, the ventilating gap 106). For example, the holding ring 430 is a round ring, the holding ring 430 is provided with the ventilating hole 431 that extends throughout it radially, the ventilating hole 431 includes but is not limited to a round hole, a rectangular slot and a semicircular slot, and the ventilating hole 431 may be one or more ventilating holes 431.

Accordingly, the gas can enter the thrust cavity 104 via the first rotation-shaft hole 131, and subsequently flows into the gas guiding channel via the ventilating hole 431. In other words, the back-pressure gap 105 is in communication with the gas guiding channel via the rotation-shaft cooperating cavity. In the present embodiment, the communication with the external flow channel 12 may be realized by providing the flow guiding gap 103, the ventilating gap 106 and the gas guiding hole 132 shown in the figures, and the gas guiding channel and the external flow channel 12 may also be communicated by providing the gas guiding hole 132 at the back plate 130 or the driving housing 120. Because the thrust bearing 400 is required to bear a large axial force, the thrust rotor 410 and the bearing foil 420 generate a large amount of heat in starting-up and high-speed operation, and the flowing gas can cool the thrust bearing 400 to a certain extent, thereby cooling the thrust bearing 400, to improve the reliability of the thrust bearing 400.

It can be understood that the present disclosure merely illustratively describes the configuration of the gas guiding channel and the gas guiding hole, and does not limit the gas guiding channel and the gas guiding hole, and they may be adjusted according to the particular structures of the back plate 130 and the driving housing 120, as long as the gas flowing is ensured.

Figure 3:
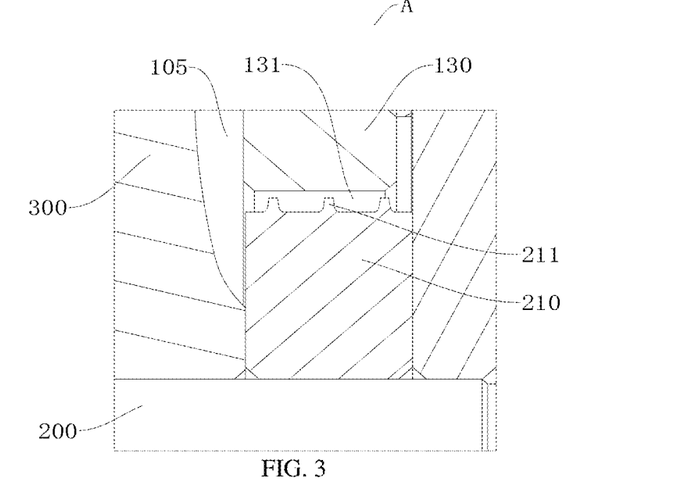
FIG. 3 is an enlarged schematic diagram of the part A circled in FIG. 2.

Optionally, as shown in FIG. 3, a shaft seal 210 is nested to the rotor shaft 200, the rotor shaft 200 is mounted inside the first rotation-shaft hole 131 by using the shaft seal 210, and a flowing gap is formed between the shaft seal 210 and the inner wall of the first rotation-shaft hole 131. Accordingly, the back-pressure gap 105 may be in communication with one of the gas guiding channel and the gas guiding hole 132 via the flowing gap. Here, whether the back-pressure gap 105, via the flowing gap, is in communication with the gas guiding channel or in communication with the gas guiding hole 132 is decided according to the particular situation. For example, in the above embodiments, when the gas guiding channel is closer to the back-pressure gap 105 in the gas-flow direction, the back-pressure gap 105 is in communication with the gas guiding channel via the flowing gap.

As shown in FIG. 4, the shaft seal 210 and the first rotation-shaft hole 131 may form a maze sealing member 211 therebetween. For example, the front end of the shaft seal 210 abuts the wheel back of the pressure wheel 300, the rear end of the shaft seal 210 abuts the thrust rotor 410, and a plurality of convex ribs are distributed separately along the axial direction of the shaft seal 210, whereby a deviously extending gap is formed inside the first rotation-shaft hole 210. That can prevent leakage of excessive gas to the thrust bearing 400.

In some particular embodiments of the present disclosure, as shown in FIG. 4, the first rotation-shaft hole 131 is in communication with the external flow channel 12 via the thrust cavity 104. In other words, after passing through the first rotation-shaft hole 131, the gas on the wheel-back side of the pressure wheel 300 flows to the external flow channel 12 via the thrust cavity 104. Accordingly, the flowing gas can take away the heat generated by the high-speed relative rotation between the rotor shaft 200 and the thrust bearing 400.

Figure 9:
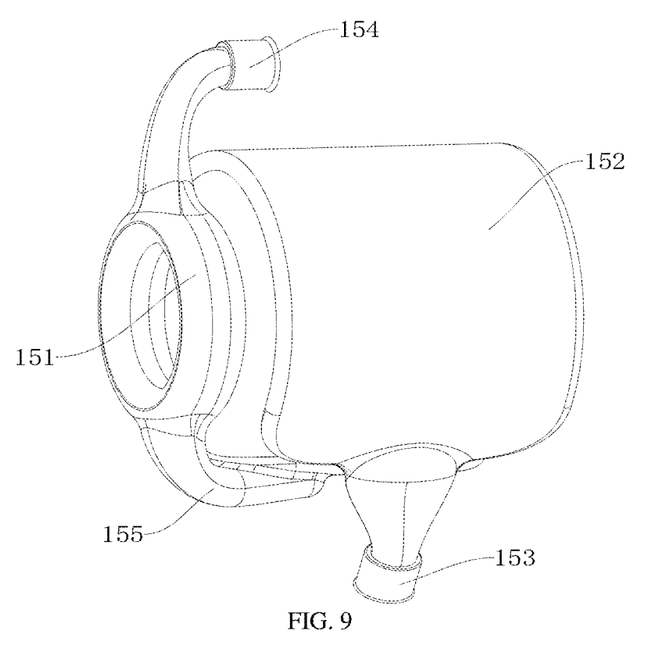
FIG. 9 is a locally schematic structural diagram of the driving housing according to an embodiment of the present disclosure.
Figure 10:
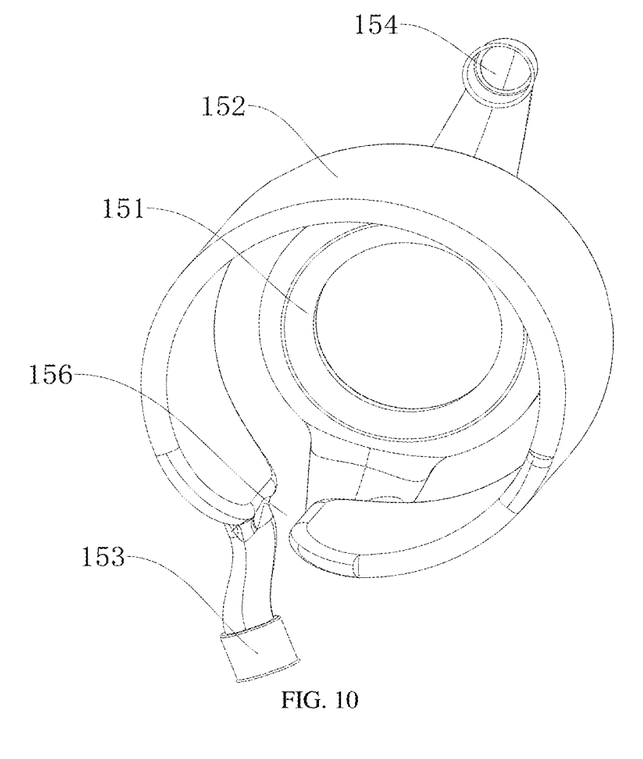
FIG. 10 is a locally schematic structural diagram of the driving housing according to an embodiment of the present disclosure.

In some embodiments of the present disclosure, as shown in FIGS. 2, 9 and 10, the housing assembly 100 is provided with a cooling flow channel 151 adjacent to the thrust bearing 400 and the internal flow channel. Accordingly, the gas inside the thrust bearing 400 and the internal flow channel can be cooled.

Optionally, as shown in FIGS. 2, 9 and 10, the housing assembly 100 is provided with a cooling flow channel 151 surrounding the second rotation-shaft hole 121, and the thrust gap is in communication with the second rotation-shaft hole 121. Accordingly, the gas flowing through the thrust cavity 104 and the second rotation-shaft hole 121 can be cooled, and the thrust bearing 400 can be cooled.

In the related art, the air compressors of fuel cells usually use a high-speed electric motor for the driving, which may dissipate a large amount of heat, and the heat dissipating component parts such as the electric motor must undergo forced cooling. Furthermore, because the high-speed relative rotation between the thrust rotor and the bearing foil and between the radial air bearing and the rotor shaft may generate a large amount of heat, it is required to configure the coolant passages of the air-bearing system and the electric motor, to realize the effective cooling of the air-bearing system and the electric motor, to ensure the safe operation of the system.

In some embodiments of the present disclosure, as shown in FIGS. 9 and 10, the driving housing 120 is provided with a cooling flow channel 151 and a cooling passage 152. The driving housing 120 may be integrated with the cooling flow channel 151 and the cooling passage 152, and the driving housing 120 may not be integrated with the cooling flow channel 151 and the cooling passage 152. The cooling flow channel 151 and the cooling passage 152 are connected by a connecting passage 155. The cooling flow channel 151 is provided with a coolant outlet 154, and the cooling passage 152 is provided with a coolant inlet 153. A separating opening 156 is disposed between the coolant inlet 153 and the cooling passage 152. That can ensure the effect of the cooling, to ensure that the coolant sufficiently cools in the cooling passage 152.

The cooling flow channel 151 is annular, and the cooling flow channel 151 is adjacent to the thrust bearing 400 and the internal flow channel. Accordingly, because the thrust bearing 400 is also an annular structure, that can improve the effect of the cooling of the thrust bearing 400 and the gas flowing through the internal flow channel. The cooling passage 152 surrounds the electric motor, whereby it can cool the electric motor.

The coolant enters the cooling flow channel 151 via the coolant inlet 153. Because of the existence of the separating opening 156, the coolant must firstly pass through the cooling passage 152 to cool the electric motor, and subsequently it can flow to the connecting passage 155, enter the cooling flow channel 151, flow inside the annular cooling flow channel 151, take away the heat of the thrust bearing 400 and the circularly flowing gas, and finally flow out of the coolant outlet 154.

Accordingly, that can cool the electric motor, can reduce the operation temperature of the thrust bearing 400, and can cool the circularly flowing gas, which ensures that the temperature of the gas when the gas flows back to the gas inlet 113 is within the design range, to prevent affecting the performance of the air compressor 10.

The air compressor 10 according to a particular embodiment of the present disclosure will be described below with reference to the drawings.

As shown in FIGS. 2-10, a cover plate 140 is mounted to the rear end of the driving housing 120 by a bolt 11, and a rubber sealing ring 13 is disposed at the connection between the cover plate 140 and the driving housing 120. The pressure wheel 300, the shaft seal 210 and the thrust rotor 410 are mounted on the rotor shaft 200 sequentially from front to rear, are pressed onto the shaft shoulder of the rotor shaft 200 by nuts 14, and are rotated together with the rotor shaft 200 at a high speed. A radial air bearing 500 is disposed inside the second rotation-shaft hole 121, a sleeve 510 is disposed on the inner side of the radial air bearing 500, and the sleeve 510 is nested to the rotor shaft 200. The radial air bearing 500 serves to support the rotor shaft 200, and the radial air bearing 500 is fixed by using a bearing seat 520.

The pressing housing 110 is provided with a gas releasing hole 112 and a returning opening 111, and the gas releasing hole 112 and the returning opening 111 are connected by the external flow channel 12. The wheel back of the pressure wheel 300 and the front surface of the back plate 130 define the back-pressure gap 105 therebetween, the back plate 130 is provided with the first rotation-shaft hole 131, and the front end face and the rear end face of the thrust rotor 410 form thrust gaps individually with the two bearing foils 420. The rear surface of the back plate 130 and the front end face of the driving housing 120 define the ventilating gap 106 and the flow guiding gap 103, the flow guiding gap 103 is located outside the ventilating gap 106, the holding ring 430 is provided with the ventilating hole 431 communicating with the thrust gap and the ventilating gap 106, and the gas guiding hole 132 communicates with the flow guiding gap 103 and the ventilating gap 106. The internal flow channel includes the back-pressure gap 105, the gap between the maze sealing member 211 and the first rotation-shaft hole 131, the thrust gap, the ventilating hole 431, the ventilating gap 106, the gas guiding hole 132 and the flow guiding gap 103.

Figure 5:
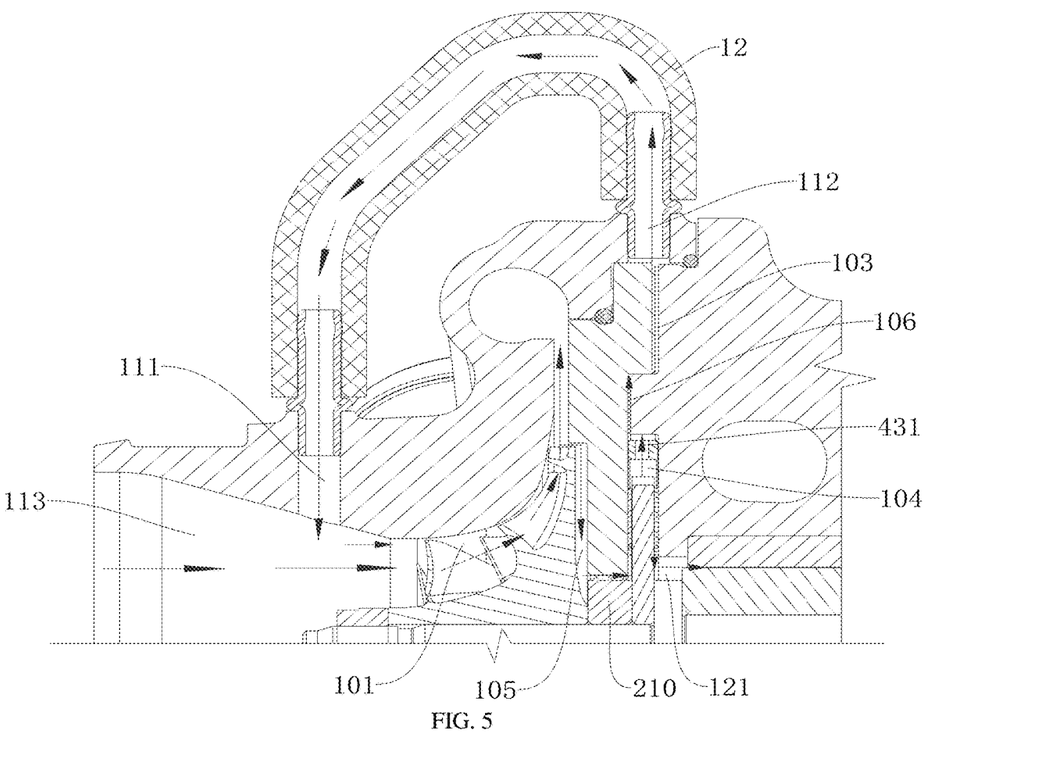
FIG. 5 is a schematic diagram of the gas flowing path inside the air compressor according to an embodiment of the present disclosure.
Figure 6:
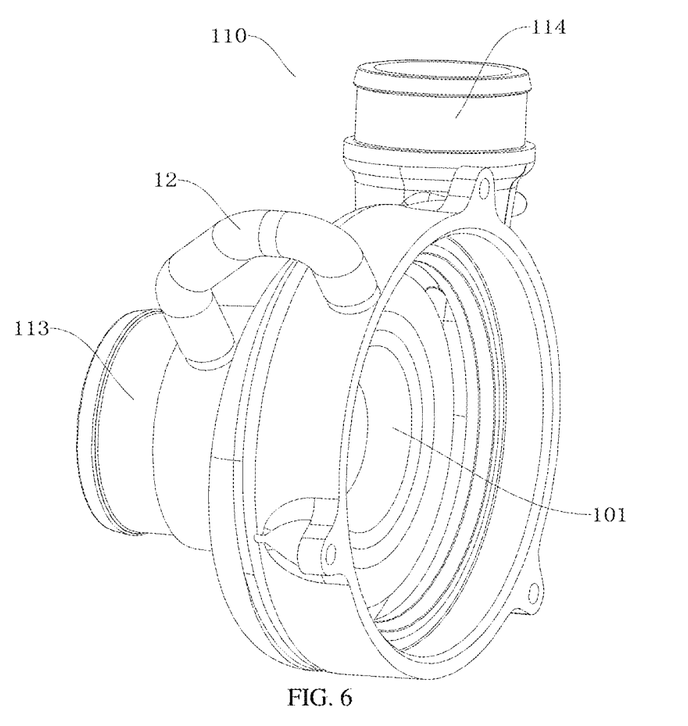
FIG. 6 is a perspective view of the pressing housing according to an embodiment of the present disclosure.

The high-pressure gas entering the back-pressure gap 105, via the gap between the maze sealing member 211 and the first rotation-shaft hole 131, enters the thrust gap. The flowing gas, after passing through the thrust gap, flows out of the ventilating hole 431 in the holding ring 430. The gas, after flowing out of the holding ring 430, passes through the ventilating gap 106, and subsequently enters the flow guiding gap 103 via the gas guiding hole 132. The gas inside the flow guiding gap 103 enters the external flow channel 12 via the gas releasing hole 112, subsequently flows to the returning opening 111 via the external flow channel 12, and enters the front side of the pressure wheel 300 again. (Part of the gas passes through the second rotation-shaft hole 121, and flows between the radial air bearing 500 and the sleeve 510 to cool them)

When flowing to the external flow channel 12, the gas on the wheel-back side of the pressure wheel 300 still has a certain positive pressure, and the returning opening 111 is located behind the operation of the air filter and in front of the pressure wheel 300, by the effects of the pressure drop of the air filter and the suction of the pressure wheel 300, the pressure of the gas at the returning opening 111 is slightly less than the atmospheric pressure. Therefore, the gas may start from the back-pressure gap 105, pass through the shaft seal 210, the thrust bearing 400, the holding ring 430, the ventilating gap 106, the gas guiding hole 132 and the flow guiding gap 103, and flow to the gas releasing hole 112, and then flow via the external flow channel 12 to the returning opening 111.

Accordingly, the gas can form an active and smooth circulation, thereby reducing the pressure on the wheel-back side of the pressure wheel 300, and in turn reducing the axial force acting on the wheel back of the pressure wheel 300. Furthermore, because the thrust bearing 400 is required to bear a large axial force, the thrust rotor 410 and the bearing foil 420 generate a large amount of heat in starting-up and high-speed operation, and the flowing gas can cool the thrust bearing 400 to a certain extent. The gas taking away the heat is cooled by the cooling flow channel 151, and subsequently flows back to the gas inlet 113, which can effectively improve the field surging characteristic of the air compressor 10, thereby improving the performance of the air compressor 10.

By leading out the high-pressure gas on the wheel-back side of the pressure wheel 300, the pressure gas behind the wheel back of the pressure wheel 300 flows within a controllable range, and a part of the pressure energy of the gas is converted into kinetic energy, thereby effectively reducing the pressure at the wheel back of the pressure wheel 300, and in turn reducing the axial force. The flowing gas, by using the pre-provided controlling flow channel, flows back via the shaft seal 210, the back plate 130, the thrust bearing 400 and the pressing housing 110 to the gas inlet 113, and the flowing gas can cool the thrust bearing 400 (the thrust rotor 410 and the bearing foil 420 generate a large amount of heat in starting-up and high-speed operation), thereby improving the reliability of the thrust bearing 400. Moreover, by disposing the cooling flow channel 151 adjacent to the thrust bearing 400 and the internal flow channel, the thrust bearing 400 and the gas flowing through the internal flow channel can be cooled. The gas flowing back to the gas inlet 113 re-enters the pressure wheel 300 to be compressed, which, in some working conditions of a high pressure ratio and a low flow rate, can effectively improve the field surging characteristic of the air compressor 10 in the low-flow-rate area, thereby improving the performance of the air compressor 10.

In brief, according to the embodiments of the present disclosure, the air compressor 10 can reduce the pressure on the wheel-back side of the pressure wheel 300, and has a simple and effective structure, which does not additionally increase the quantity and the cost of the components. Moreover, the air compressor 10 can use the flowing gas to cool the thrust bearing 400, and can use the cooling flow channel 151 to cool the gas taking away the heat, and the gas flows back to the gas inlet 113, which can alleviate surge.

A vehicle according to an embodiment of another aspect of the present disclosure includes the air compressor 10 according to the embodiments of the first aspect of the present disclosure.

The vehicle according to the embodiment of the present disclosure, by using the air compressor 10 according to the embodiments of the first aspect of the present disclosure, effectively reduces the pressure on the wheel-back side of the pressure wheel 300, and reduces the axial force, which can prolong the service life of the fuel cell, and improve the efficiency of the entire system. Furthermore, the vehicle has a simple and effective structure and a low cost. Moreover, the vehicle can effectively improve the field surging characteristic, thereby improving the performance of the fuel cell.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

The description provided herein describes many concrete details. However, it can be understood that the embodiments of the present disclosure may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present disclosure may be implemented by means of hardware comprising several different elements and by means of a properly programmed computer. In unit claims that list several devices, some of those devices may be embodied by the same item of hardware. The words first, second, third and so on do not denote any order. Those words may be interpreted as names.

The above description is merely preferable embodiments of the present disclosure, and is not indented to limit the present disclosure. Any modifications, equivalent substitutions and improvements that are made within the spirit and the principle of the present disclosure should fall within the protection scope of the present disclosure.

The invention claimed is:

1. An air compressor, wherein the air compressor comprises:
    a housing assembly, wherein the housing assembly has a first installation cavity, a second installation cavity and a rotation-shaft cooperating cavity, the rotation-shaft cooperating cavity is disposed between the first installation cavity and the second installation cavity, and the first installation cavity has a gas inlet and a gas outlet;
    a rotor shaft, wherein the rotor shaft is rotatably fitted inside the rotation-shaft cooperating cavity, and extends into the first installation cavity and the second installation cavity;
    a pressure wheel, wherein the pressure wheel is nested to the rotor shaft and is located inside the first installation cavity, and the housing assembly is provided with a controlling flow channel for communicating a gas-intake side and a wheel-back side of the pressure wheel; and
    a driving assembly, wherein the driving assembly is nested to the rotor shaft and is located inside the second installation cavity;
    the first installation cavity is provided with a returning opening, and the returning opening is disposed on the gas-intake side of the pressure wheel and is in communication with the controlling flow channel; and
    the controlling flow channel comprises an internal flow channel and an external flow channel, the internal flow channel is defined by the housing assembly and is in communication with the wheel-back side of the pressure wheel, the external flow channel is in communication with the internal flow channel and the returning opening and is located outside the housing assembly, and the external flow channel comprises a communicating pipe.

2. The air compressor according to claim 1, wherein the internal flow channel is in an axial direction of the rotor shaft, and is located between the first installation cavity and the second installation cavity.

3. The air compressor according to claim 1, wherein the housing assembly comprises:
    a pressing housing, wherein the pressing housing defines the first installation cavity;
    a driving housing, wherein the driving housing defines the second installation cavity; and
    a back plate, wherein the back plate is disposed between the pressing housing and the driving housing, the back plate is located on the wheel-back side of the pressure wheel and forms a back-pressure gap with the pressure wheel, the driving housing is disposed on one side of the back plate that is opposite to the pressure wheel, and the back plate and the driving housing enclose to form a thrust cavity; and
    the back plate is provided with a first rotation-shaft hole, a second rotation-shaft hole is disposed inside the driving housing, a thrust bearing is disposed inside the thrust cavity, and the first rotation-shaft hole, the second rotation-shaft hole and the thrust cavity jointly define the rotation-shaft cooperating cavity.

4. The air compressor according to claim 3, wherein a gas guiding channel is disposed at the back plate or the driving housing, and the gas guiding channel is in communication with the back-pressure gap to form a part of the controlling flow channel.

5. The air compressor according to claim 4, wherein the back-pressure gap is in communication with the gas guiding channel or the gas guiding hole via the rotation-shaft cooperating cavity.

6. The air compressor according to claim 5, wherein a shaft seal is nested to the rotor shaft, the rotor shaft is mounted inside the first rotation-shaft hole by using the shaft seal, a flowing gap is formed between the shaft seal and an inner wall of the first rotation-shaft hole, and the gas guiding channel or the gas guiding hole is in communication with the back-pressure gap via the flowing gap.

7. The air compressor according to claim 6, wherein a maze sealing member is disposed between the shaft seal and the first rotation-shaft hole.

8. The air compressor according to claim 3, wherein a gas guiding channel is formed between the back plate and the driving housing, a gas guiding hole is disposed at the back plate or the driving housing, and the back-pressure gap, the gas guiding channel and the gas guiding hole are communicated to form a part of the controlling flow channel.

9. The air compressor according to claim 8, wherein the gas guiding hole comprises a first gas guiding hole and a second gas guiding hole, the first gas guiding hole is disposed at a position of the back plate closer to a central part of the back plate, the second guiding hole is disposed at an edge of the back plate; the gas guiding channel comprises a flow guiding gap formed between the driving housing and the back plate, and a ventilating gap formed between the driving housing and the back plate, two ends of the ventilating gap are in communication with one side of the thrust cavity and the first gas guiding hole, and the second gas guiding hole is in communication with the flow guiding gap.

10. The air compressor according to claim 8, wherein a holding ring is disposed inside the thrust cavity, the holding ring is sandwiched between the driving housing and the back plate, and the holding ring is provided with a ventilating hole that communicates with the thrust cavity and the gas guiding channel.

11. The air compressor according to claim 3, wherein the thrust bearing comprises a thrust rotor and a bearing foil; and
    the thrust rotor is nested to the rotor shaft, the bearing foil is disposed on a side wall of the thrust cavity, and the bearing foil and the thrust rotor are spaced to form a thrust gap that is in communication with the first rotation-shaft hole.

12. The air compressor according to claim 3, wherein the housing assembly is provided with a cooling flow channel.

13. The air compressor according to claim 12, wherein
the cooling flow channel is adjacent to the thrust bearing and the internal flow channel, and the cooling flow channel is annular; or the cooling flow channel surrounds the second rotation-shaft hole.

14. The air compressor according to claim 13, wherein the cooling flow channel is provided with a coolant outlet, and a cooling passage of the driving housing is provided with a coolant inlet; and a separating opening is disposed between the coolant inlet and the cooling passage of the driving housing.

15. The air compressor according to claim 12, wherein the driving housing is further provided with a cooling passage, and the cooling passage is connected to the cooling flow channel by a connecting passage; and the driving housing, the cooling flow channel and the cooling passage form an integral structure; or the driving housing, the cooling flow channel and the cooling passage form a separated structure.

16. The air compressor according to claim 3, wherein rubber sealing rings are provided individually at a connection between the pressing housing and the driving housing and at a connection between the pressing housing and the back plate.

17. A vehicle, wherein the vehicle comprises the air compressor according to claim 1.

* * * * *